United States Patent
Wakabayashi et al.

(10) Patent No.: US 7,286,709 B2
(45) Date of Patent: Oct. 23, 2007

(54) APPARATUS AND COMPUTER PROGRAM FOR DETECTING MOTION IN IMAGE FRAME

(75) Inventors: Tsukimi Wakabayashi, Yokosuka (JP); Naoko Yurino, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 832 days.

(21) Appl. No.: 10/650,727

(22) Filed: Aug. 29, 2003

(65) Prior Publication Data

US 2004/0047419 A1    Mar. 11, 2004

(30) Foreign Application Priority Data

Sep. 9, 2002 (JP) ............................ 2002-262607
Jun. 24, 2003 (JP) ............................ 2003-180328

(51) Int. Cl.
*G06K 9/36* (2006.01)
*G06K 9/46* (2006.01)

(52) U.S. Cl. ........................ 382/236; 382/103
(58) Field of Classification Search ............... 382/236
See application file for complete search history.

(56) References Cited

U.S. PATENT DOCUMENTS

| | | | | |
|---|---|---|---|---|
| 5,327,232 A | * | 7/1994 | Kim | 375/240.14 |
| 5,731,832 A | * | 3/1998 | Ng | 348/155 |
| 5,790,695 A | * | 8/1998 | Suwa | 382/166 |
| 6,233,008 B1 | * | 5/2001 | Chun | 348/170 |
| 6,591,015 B1 | * | 7/2003 | Yasunari et al. | 382/236 |
| 6,819,713 B1 | * | 11/2004 | Sato | 375/240.12 |
| 6,954,225 B2 | * | 10/2005 | Chen | 348/207.99 |

FOREIGN PATENT DOCUMENTS

| | | |
|---|---|---|
| JP | 08046925 | 2/1996 |
| JP | 11039495 | 2/1999 |

* cited by examiner

*Primary Examiner*—Wenpeng Chen
*Assistant Examiner*—Yuzhn Ge
(74) *Attorney, Agent, or Firm*—Stevens, Davis, Miller & Mosher, LLP

(57) ABSTRACT

An object of the present invention is to precisely and stably detect a motion in an monitoring image, excluding effects of an illumination change and flicker. The frame division means divides an inputted X-th image frame F (X) into a plurality of blocks B(X)ij. Representative (e.g, average) luminance values BLrep (X)ij of block B (X) ij, a representative luminance value FLrep (X) of F (X), block luminance differences ΔBLrep (X)ij between the frame F (X) and a frame prior to F (X) and a frame luminance difference ΔFLrep (X) between the present frame F (X) and a frame prior to F (X) are calculated. Then, a certain block is determined to include a motion, if |ΔBLrep (X)ij−ΔFLrep (X)| for that certain block is greater than a prescribed threshold. The threshold may be adaptively changed in accordance with the luminance state.

6 Claims, 9 Drawing Sheets

| SENSITIVITY | Th1 | Th2 | Th3 |
|---|---|---|---|
| HIGH | 128 | 30 | 15 |
| MEDIUM | 128 | 70 | 35 |
| LOW | 128 | 100 | 50 |

FIG. 12A
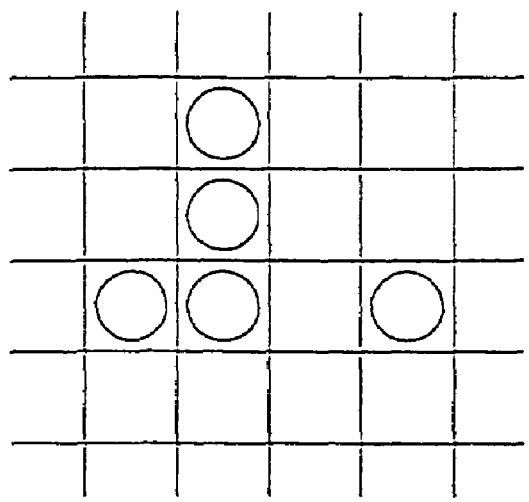
FIG. 12B
| | 1 | 1 | 1 | | |
|---|---|---|---|---|---|
| | 2 | 9 | 2 | | |
| 1 | 3 | 11 | 3 | 1 | 1 |
| 1 | 10 | 10 | 3 | 8 | 1 |
| 1 | 2 | 2 | 3 | 1 | 1 |
FIG. 12C
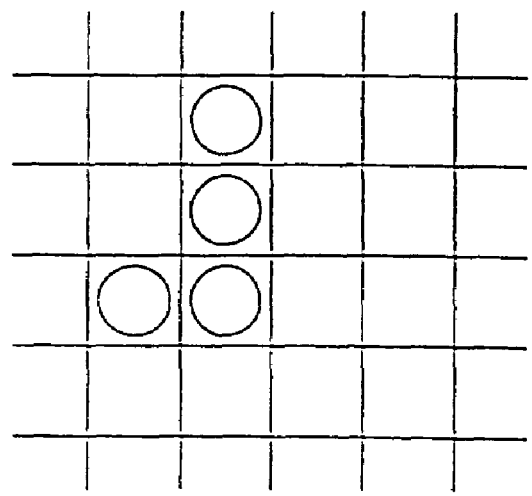

APPARATUS AND COMPUTER PROGRAM FOR DETECTING MOTION IN IMAGE FRAME

BACKGROUND OF THE INVENTION

1. Field of the Invention

The present invention relates to an apparatus and computer program for detecting a motion in an image frame and particularly to an improvement thereof wherein the motion detection is not affected by a change in illumination.

2. Description of the Related Art

There have been increased demands on security monitoring systems not only for industrial facilities, but also for small commercial facilities and ordinary families.

If the facility must be strictly observed, there are being arranged equipments and staffs for always watching the monitoring images. However, it is not easy for the commercial facilities and ordinary families to maintain strict observations.

Therefore, ordinary monitorings are executed in such a manner that automatic image recordings by a video tape recorder (VTR) or digital versatile disc (DVD) and automatic alarm generations are employed, only when a moving object such as an intruder is found out by a monitoring camera.

One of the image monitoring system employing a simplified motion detection apparatus is disclosed in JP11-39495A, 1999, pages 3-4 and FIGS. 2 and 3, wherein: an image frame is divided into a plurality of blocks; luminance or color signals are averaged every block; a difference between the present average and past average (average at several frames prior to the present frame) is compared every corresponding block; and it is determined that there is a motion if the difference is greater than a prescribed threshold.

However, the above mentioned conventional motion detection system has a disadvantage that an illumination change in the monitoring area may erroneously be determined to be a detected motion.

Here, the illumination change includes various examples such as a daylight change, turning on and off of lights at twilight or dawn and automobile lights shining into the monitoring area at night.

Further, flickers inevitably generated in video camera images may possibly be determined to be a detected motion.

Thus, the illumination change or flicker may be erroneously determined to be a detected motion in the conventional system as disclosed in JP11-39495A, 1999, because the motion is detected on the basis of the differences of luminance or color data between corresponding blocks in present and past frames.

Therefore, the above mentioned conventional system causes useless image recordings and alarms due to the erroneous motion detection, thereby inefficiently recording and searching images and causing a guard to rush to the monitoring spot, although it is not an emergency.

Although the erroneous motion detection may be reduced by an increased value of the prescribed threshold by which the motion is detected, a detection sensitivity becomes too lowered to accomplish a sufficient monitoring function.

SUMMARY OF THE INVENTION

An object of the present invention is to precisely and stably detect a motion in a monitoring image, excluding effects of an illumination change and flicker.

In the motion detection apparatus of the present invention, a motion included in an image frame inputted and stored in a time series is detected.

Concretely, the frame division means divides an inputted present image frame (X-th image frame $F(X)$) into a plurality of blocks $B(X)ij$, where $i=1$ to m and $j=1$ to n.

Further, the block luminance acquisition means acquires representative luminance values $BLrep(X)ij$ of all the blocks $B(X)ij$.

Further, the frame luminance acquisition means acquires a representative luminance $FLrep(X)$ of the inputted frame $F(X)$.

Further, the storing means stores $BLrep(X)ij$ and $FLrep(X)$.

Further, the block luminance difference calculation means calculates block luminance differences $\Delta BLrep(X)ij$ between the present frame $F(X)$ and a past frame. Here, if the past frame is a frame $F(X-1)$ just prior to the present frame $F(x)$, then, $$\Delta BLrep(X)ij = BLrep(X)ij - BLrep(X-1)ij$$

Further, the frame luminance difference calculation means calculates a frame luminance difference $\Delta FLrep(X)$ between the frame $F(X)$ and a frame prior to $F(X)$. Similarly, $$\Delta FLrep(X) = FLrep(X) - FLrep(X-1)$$

Further, the absolute luminance difference calculation means calculates absolute luminance differences (ALD) defined by $$ALD = |\Delta BLrep(X)ij - \Delta FLrep(X)|$$

Further, the determination means determines that a certain block includes a motion, if ALD for the certain block is greater than a prescribed threshold.

Further, the output means outputs the motion determination result.

Furthermore, the computer program of the present invention allows a computer to function as the above-mentioned motion detection apparatus of the present invention.

Thus, the present invention is characterized in that a motion is detected on the basis of the absolute value of the luminance difference (ALD) between the block luminance difference $\Delta BLrep(X)ij$ and frame luminance difference $\Delta FLrep(X)$.

Here, the representative value may be an average, mode or median.

According to the apparatus and computer program of the present invention, the luminance change due to any cause other than a motion is cancelled, thereby excluding an erroneous motion detection.

Further, according to the present invention, a local noise such as a flicker is equalized. This is because the block luminance acquisition means acquires $BLrep(X)ij$, the frame luminance acquisition means acquires $FLrep(X)$ and further computations and motion determinations are executed on the basis of those representative values. Thus, the local noise is also excluded from the motion detection.

The two frames inputted sequentially in a time series may be the present frame $F(X)$ and $F(X-1)$ just prior to $F(X)$ or the present frame $F(X)$ and a past frame $F(X-k)$ which is several ("k") frames prior to $F(X)$, where "k" is two or more.

More preferably, the prescribed threshold for the motion detection may be adaptively optimized, for example, by employing three thresholds.

By using those three threshold, the motion is detected in such a manner that a block is determined to include a motion, if ALD is greater than a second threshold and moreover if either/both of the representative block luminance values BLrep (X)ij for the present frame and past frame is/are greater than a first threshold, where the first threshold is greater than the second threshold. Further, a block is determined to include a motion, if ALD is greater than a third threshold and moreover if both of the representative block luminance values BLrep (X)ij for the present frame and past frame are smaller than or equal to a first threshold, where the second threshold is greater The above-mentioned principle of the motion detection is based on an experimental knowledge that ALD is apt to become increased when at least one of the representative block luminance values of the blocks in the two inputted frames increases, while ALD is apt to become decreased when both of the representative block luminance values in the two inputted frames decreases. The motion determination become precise, when the threshold value is adaptively changed in accordance with a state of the representative block luminance values. The first threshold is employed in order to confirm a state of the representative block luminance values. Then, the second or third threshold is employed in accordance with the confirmation result.

BRIEF EXPLANATION OF THE DRAWINGS

FIGS. 12A, 12B and 12C illustrate other embodiment concerning a method for neglecting an isolated block including a motion by giving a prescribed score to a moving block. The detected moving blocks are shown by "○" in FIG. 12A. Then, every moving block is given a score of eight, while every block surrounding the moving block is given a score of one. The example of scores for the blocks are shown in FIG. 12B. As a result, the isolated moving block is removed, if the threshold score is nine, as shown in FIG. 12C.

PREFERRED EMBODIMENT OF THE INVENTION

Figure 1:
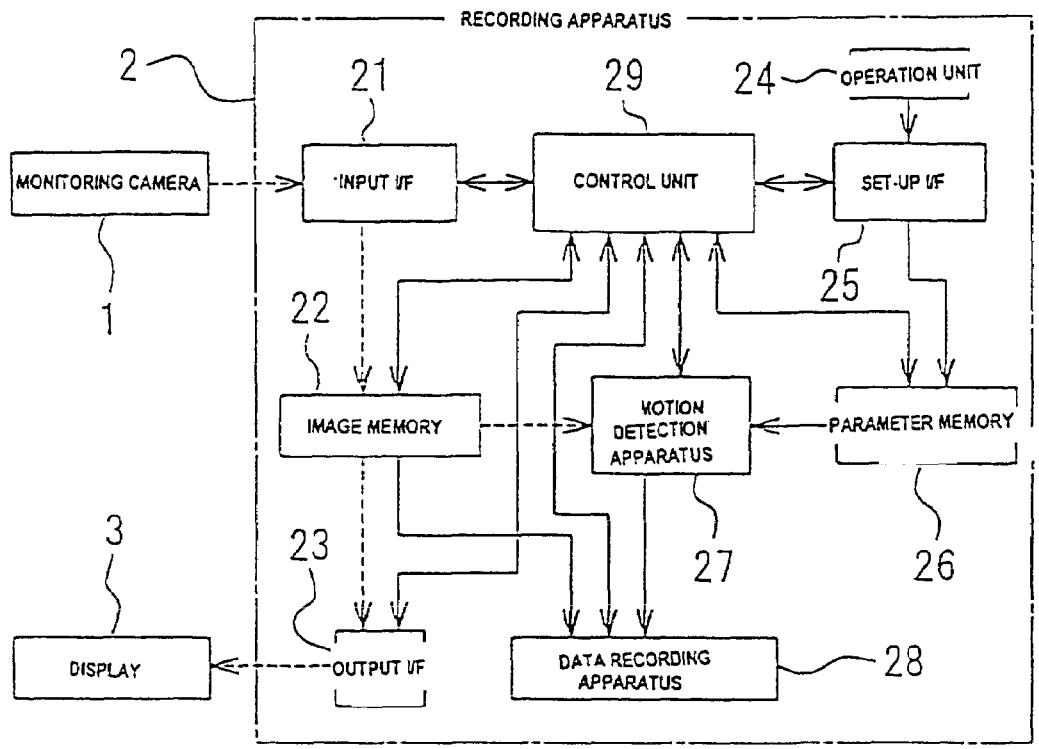
FIG. 1 is a block diagram of a monitoring and recording system including the motion detection apparatus of the present invention.

Preferred embodiments of the motion detection apparatus of the present invention are explained, referring to the drawings. The present invention also includes a computer program for executing the function of the motion detection apparatus. The computer program is loaded from a recording medium into a computer or down-loaded through a communication network into the computer.

Embodiment 1

FIG. 1 is a block diagram of a monitoring and recording system including the motion detection apparatus of the present invention. The monitoring and recording system comprises: a monitoring camera 1; a recording apparatus 2 for recording and processing images picked up by the monitoring camera 1; and a display 3 for displaying the picked-up images on the real time basis.

The recording apparatus 2 comprises: an input interface (I/F) 21 for inputting the image from the monitoring camera 1 and converting it into digital data; an image memory 22 for storing the inputted image; an output I/F 23 for converting the inputted image stored in the image memory 22 into a display signal and outputting it to the display 3; an operation unit 24 for turning on and off a system operation, setting up parameters for the motion detection such as the determination threshold; a set-up I/F 25 for accepting inputs from the operation unit 24; a parameter memory 26 for storing set-up values accepted by the set-up I/F 25; a motion detection apparatus 27 of the present invention for detecting a motion in the inputted image; a data recording apparatus 28 for recording the inputted image stored in the image memory 22, only when a motion was detected in the inputted image; and a control unit 29 for controlling the overall system.

Thus, the monitoring system as shown in FIG. 1 displays the picked-up image on the display 3 and records in a recording medium the picked-up image, only when the motion detection apparatus 27 detected a motion in the picked-up image.

Further, when the motion detection signal was received by the control unit 29, the control unit 29 may actuate a not-shown alarm apparatus.

Figure 2:
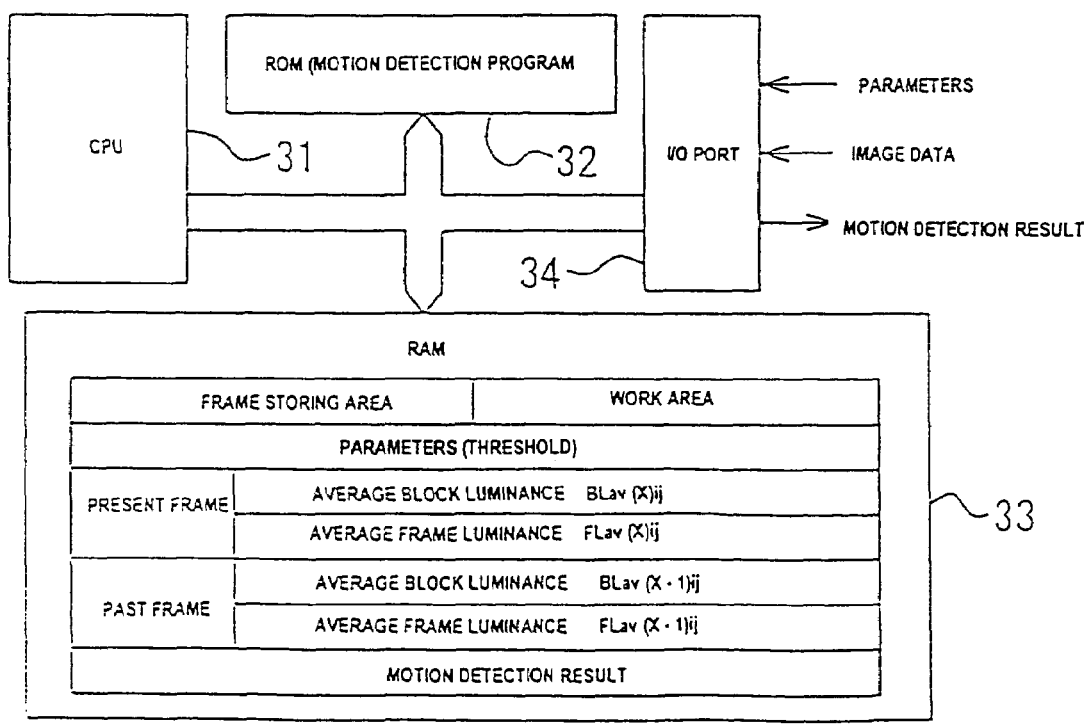
FIG. 2 is a block diagram of the motion detection apparatus of the present invention which is a general microcomputer.

FIG. 2 is a block diagram of the motion detection apparatus 27 of the present invention which is a general microcomputer circuit which comprises CPU 31, ROM 32, RAM 33 and I/O port 34 which are connected with each other by an address bus and data bus.

CPU 31 reads out a motion detection program stored in ROM 32 and executes it.

ROM 32 stores beforehand the motion detection program.

RAM 33 assures: a frame memory area for storing at least one frame image; a work area for executing various calculations; a parameter memory area for storing parameters such as the determination thresholds; a data memory area for storing various data, e.g., an average block luminance values BLav ((X)ij for blocks B (X) ij in a frame F (X) and FLav (X) in F (X) which are obtained in the motion detection process; and a motion detection result memory area for storing motion detection results for the blocks B (X)ij.

I/O port 34 inputs the image stored in the image memory 22 and parameters stored in the parameter memory 26 and outputs the motion detection result to the data recording apparatus 28.

Figure 3:
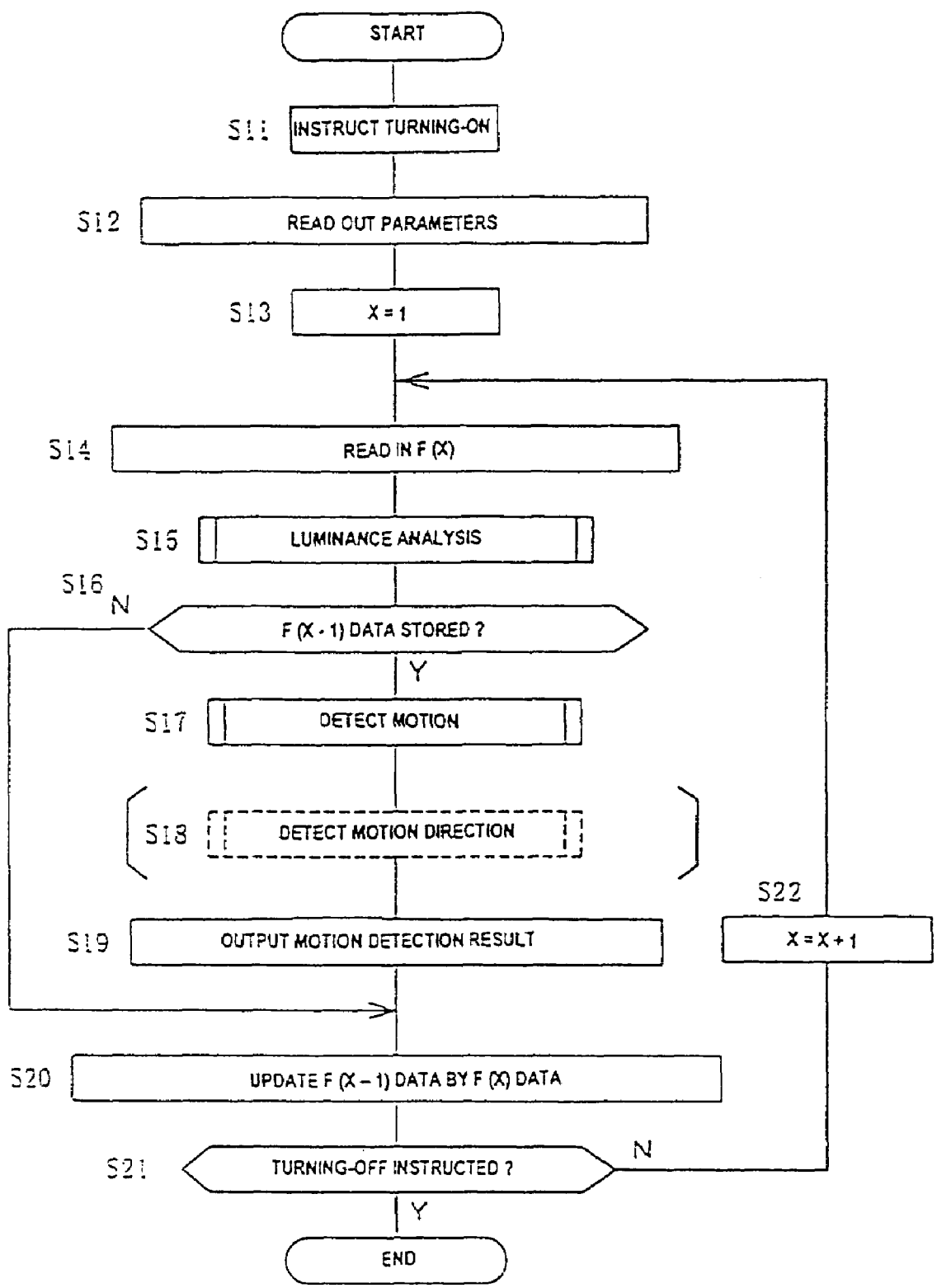
FIG. 3 is a flow chart of the operation of the motion detection apparatus of Embodiment 1 of the present invention.

FIG. 3 is a flow chart of the operation of the motion detection apparatus 27 of the present invention.

It is assumed here that the parameters such as motion determination thresholds are already inputted from the operation unit 24 and are stored in the parameter memory 26.

When the operation unit 24 instructs at S11 to turning on the motion detection process, the control unit 29 starts up the motion detection apparatus 27 which: reads out through the I/O port the parameters stored in the parameter memory 26; stores them into RAM 33; and sets up initial states for a data processing to be executed at S12.

Immediately after setting up the initial states, the image stored in the image memory 22 is read out at S13 and S14 on the frame by frame basis and read-out image is stored in RAM 33.

Thus, at S15, an image division and luminance analysis are executed.

Figure 4:
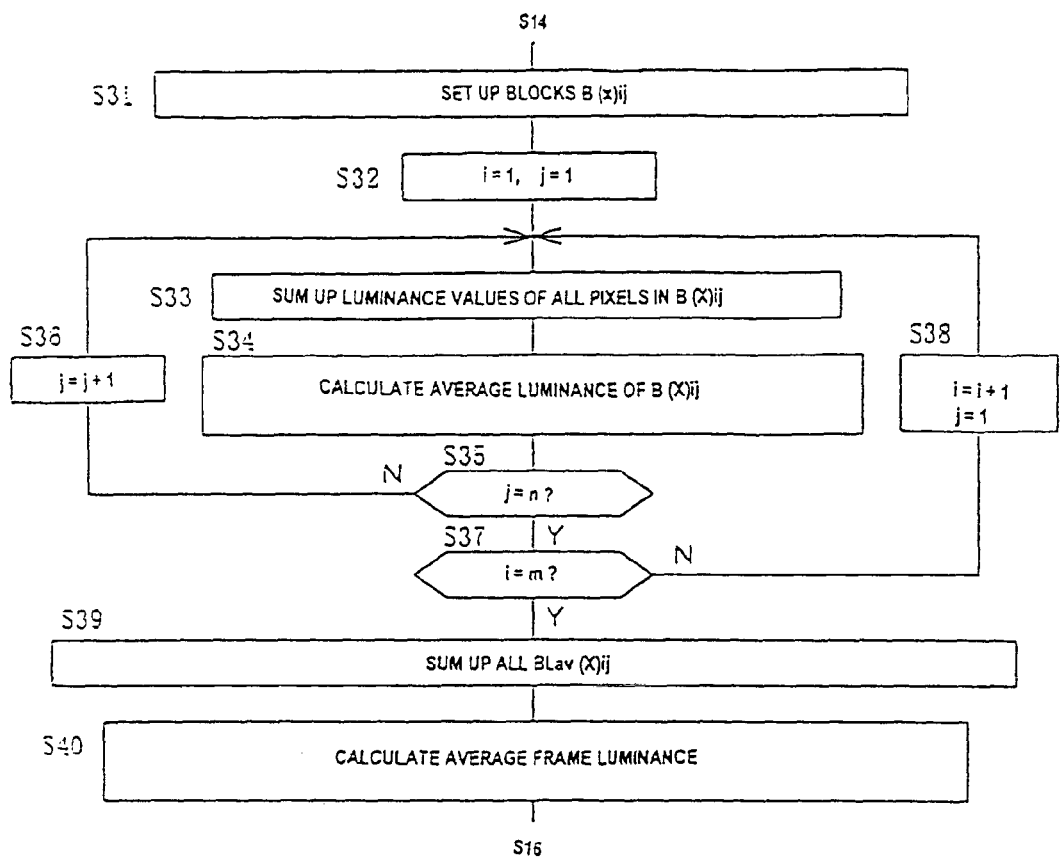
FIG. 4 is a flow chart of the image frame division and luminance analysis included in the flow chart as shown in FIG. 3.

FIG. 4 is a flow chart of the image division and luminance analysis at S15.

First, at S31 as shown in FIG. 4 following S14 as shown in FIG. 3, the image frame F (X) is divided into a plurality of blocks, e.g., square blocks.

Figure 5:
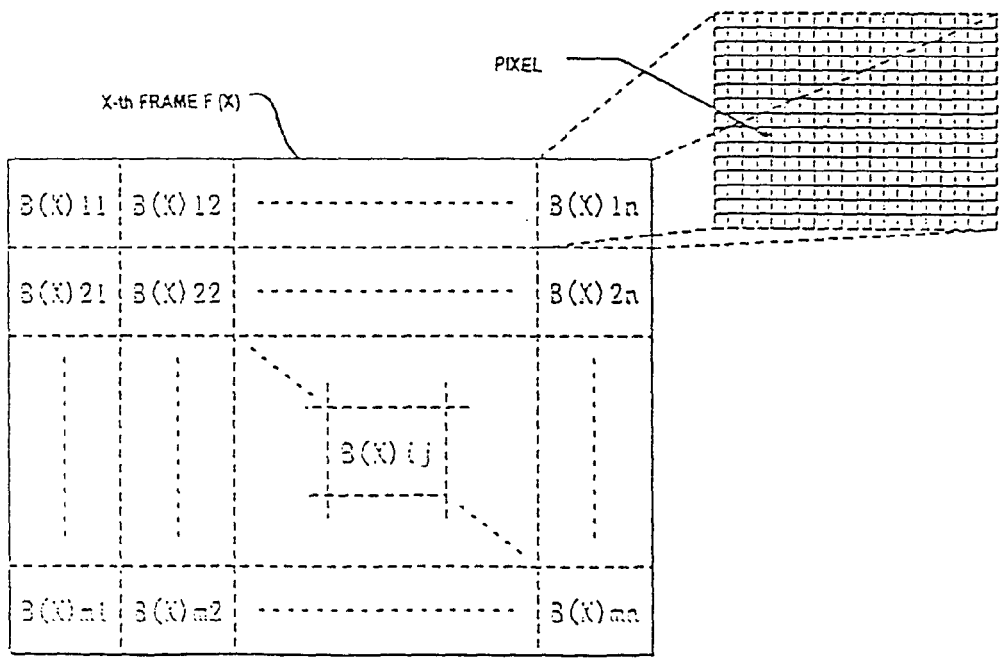
FIG. 5 is an illustration of an image frame and the square blocks divided from an image frame.

FIG. 5 shows the above-mentioned blocks. The blocks B (X)ij, where i=1 to m (along the horizontal direction) and j=1 to n (along the vertical direction) are divided from the image frame F (X). Each B (X)ij naturally contains a plurality of pixels.

Then, at S33, the luminance values of all pixels in every B (X)ij are added. Further, at S34, the added luminance values are divided by a pixel number "mn" of B (X)ij, thereby obtaining a block luminance average BLav (X)ij which is stored in RAM 33.

The block luminance average Blav (X)ij is calculated at S32 to S38 in such a manner that the upper most horizontal blocks BL (X)ij is calculated from j=1 to "n", then the second upper most blocks BL (X) 2j are calculated similarly and finally the last block BL (X) mn is calculated, thereby completing the average calculation for one frame.

Next, at S39, all Blav (X) ij in F (X) are summed up and the summed-up value is divided by the block number "mn", thereby obtaining a frame luminance average Flav (X) for F (X).

The frame luminance average Flav (X) is stored at S40 in RAM 33, thereby completing the image division and luminance analysis at S15 as shown in FIG. 3.

It is confirmed at S16 as shown in FIG. 3 that BLav (X)ij and Flav (X) are stored in RAM 33.

If it is assumed that F (1) is the present frame, the average data of the past frame prior to the first frame F (1) is not stored in RAM 33. Therefore, the average data for F (1) are stored in RAM 33, at S16 to S20.

On the other hand, as for F (X) for "X" greater than or equal to two, the data prior to F (X) are already stored in RAM 33.

Accordingly, the following step S17 is explained for "X" is greater than or equal to two.

Figures 6, 7:
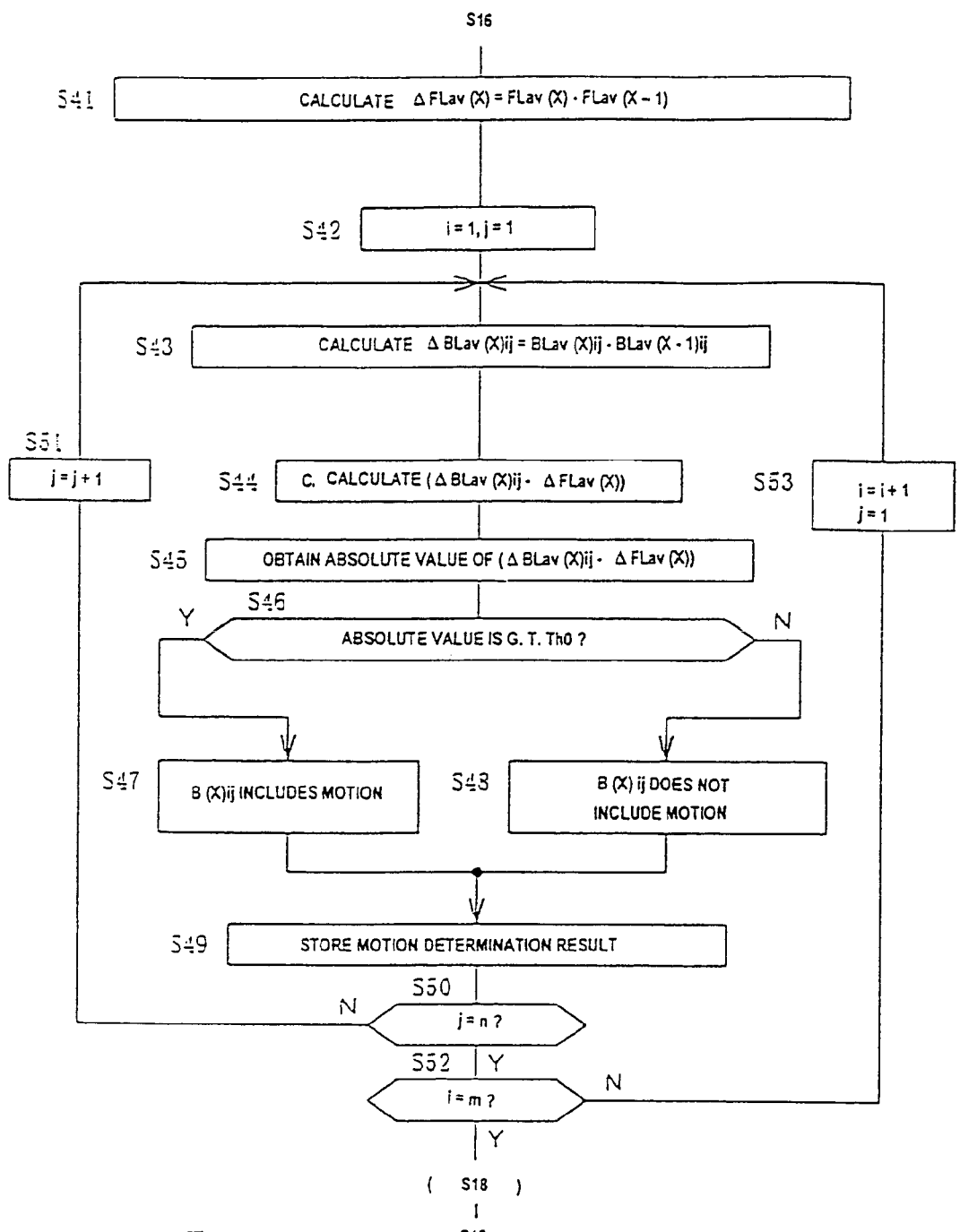
FIG. 6 is a concrete flow chart of the motion detection step included in the general flow chart as shown in FIG. 3.
FIG. 7 is a table of the three thresholds to be selected adaptively in accordance with a luminance state in Embodiment 2.

FIG. 6 is the concrete steps of the motion detection at S17 as shown in FIG. 3.

First, at S41 as shown in FIG. 6 following S16 as shown in FIG. 3, a frame luminance difference ΔFLav (X) (=FLav (X)−FLav (X−1)) is calculated and the calculated difference is stored in RAM 33.

At S43, a block luminance difference ΔBLav (X) ij (=BLav (X)ij−BLav (X−1)ij) is calculated and the calculated difference is stored in RAM 33. Here, (i, j) runs from (1, 1) at S42 to (m, n) at S50 and S52.

Further, at S44, a difference between the above mentioned block illuminance differences ΔBLav (X)ij and frame luminance difference ΔFLav (X) is calculated, thereby obtaining at S45 an absolute value ALD of the calculated luminance difference LD(=ΔBLav (X)ij−ΔFLav (X)).

The motion detection is executed on the basis of ALD.

At S46, ALD is compared with a threshold Th0 stored beforehand in RAM 33. If ALD is greater than Th0, then B (x) ij is determined at S47 to be moving, while ALD is smaller than or equal to Th0, then B (x) ij is determined at S48 to be standing (not moving).

The determination result is stored in RAM 33 at S49.

The calculation at S42 to S52 as shown in FIG. 6 of LD (=ΔBLav (X)ij−A FLav (X)) starts from B (X) 11 and ends at B (X) mn, similarly to the luminance analysis at S32 to S38 as shown in FIG. 4.

The determination result (motion detection result) stored in RAM 33 is outputted to the data recording apparatus 28 at S19 as shown in FIG. 3.

Further, at S20, BLav (X−1) ij and FL av (X−1) is updated by overwriting them by BLav (X) ij and FL av (X) stored in RAM 33.

Here, S18 as shown in FIG. 3 which is not executed in Embodiment 1 will be explained later as Modified Embodiment 1.

Following S20, a next frame F (X+1) is read out at S22 from the image memory 22, as far as the control unit 29 does not instruct to turn off the motion detection process. Thus, a motion of B (X+1) ij is detected, BLav (X) ij and FL av (X) is updated by BLav (X+1) ij and FL av (X+1) at S14 to S20.

The motion detection result is always outputted to the data recording apparatus 28. Accordingly, the data recording apparatus 28 records only the frame including a moving block, thereby avoiding a useless image recording.

The clock time when the motion was detected may be confirmed, if a time data is written at a prescribed position in the recorded image data by using a built-in timer in the data recording apparatus 28.

Here, it is assumed that the illumination is changed in the monitoring area.

The illumination change causes |ΔBLav (X)ij| as well as |ΔFLav (X)| to increase.

Accordingly, the illumination change is cancelled in |ΔBLav (X)ij−ΔFLav (X)|, thereby stabilizing the precise motion detection by using a prescribed constant threshold Th0.

Further, |ΔBLav (X)ij−A FLav (X)| is calculated on the basis of BLav (X) ij, BLav (X−1)ij, FLav (X) and FLav (X−1). Accordingly, the luminance change is equalized, even if the noises such as the flicker are mixed in them. Therefore, the flicker noise also does not affect the motion detection.

Further, the calculation load for the motion detection is reduced, because the pixel luminances are averaged for every BL (X)ij in the image division and luminance As for the determination threshold Th0, it may be about 50, if the luminance of 8 bit image data is 0 to 255.

Th0 is remarkably low compared with that of JP11-39495A, 1999, wherein the threshold could not be reduced due to the illumination effect on the motion detection and therefore, the detection sensitivity was forced to be lowered.

Embodiment 2

The accuracy of the motion detection is further improved in Embodiment 2, although: the monitoring system is the same as shown in FIG. 1; the motion detection apparatus 27 is the same as shown in FIG. 2; an outline of the motion detection flow chart is the same as that as shown in FIG. 3; and the image division and luminance analysis at S15 as shown in FIG. 4 is the same as that in Embodiment 1.

However, there are employed in the motion detection apparatus 27 three thresholds at S17 as shown in FIG. 3.

FIG. 7 is a table data of the three thresholds Th1, Th2 and Th3 for a high, medium and low sensitivities.

The exemplified thresholds as shown in FIG. 7 are fixed on the basis of the luminance 0 to 255 of the 8 bit quantized image data.

Figure 8:
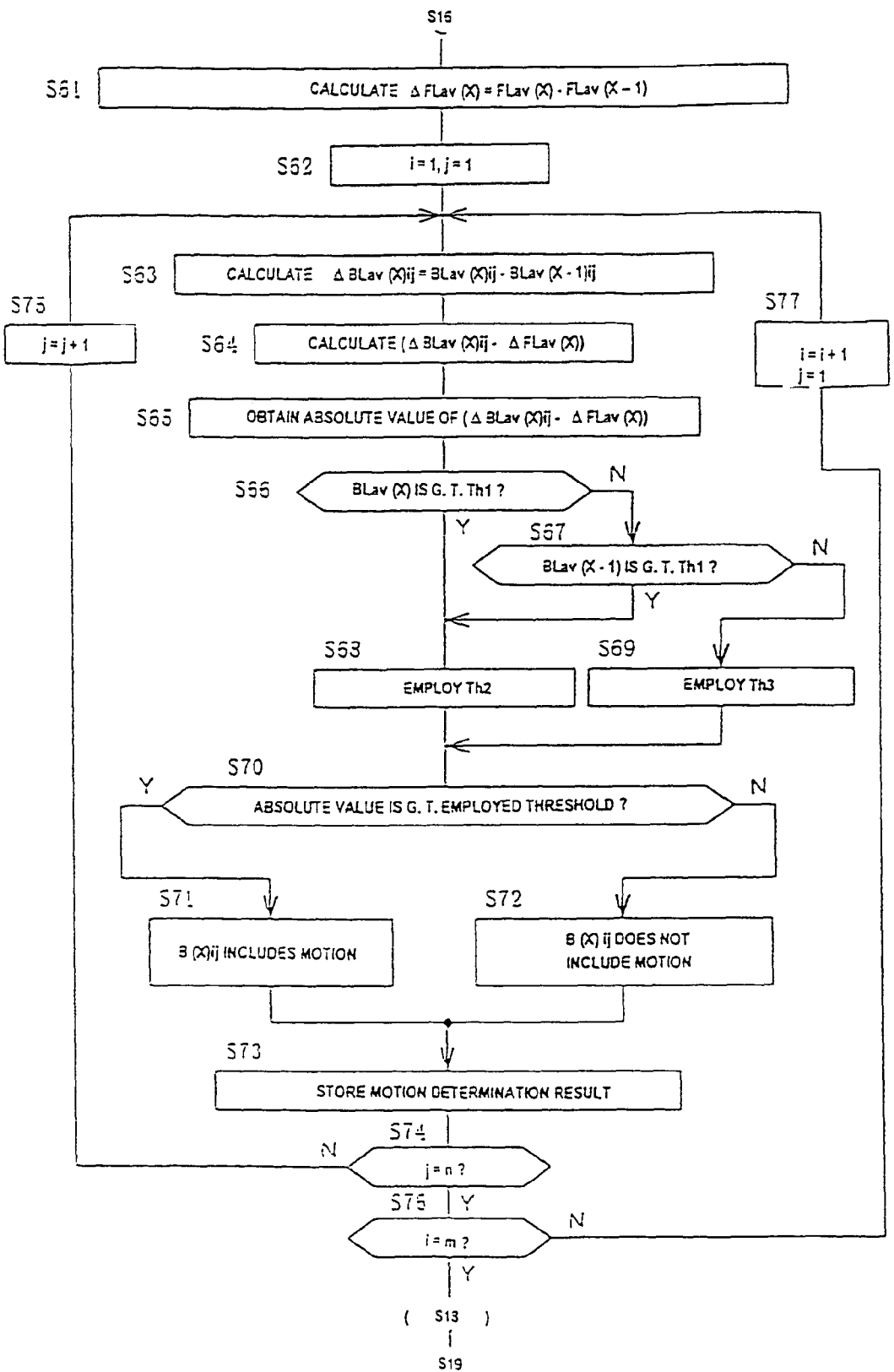
FIG. 8 is a concrete flow chart of the adaptive motion detection by using the three thresholds as shown in FIG. 7.

FIG. 8 is a concrete flow chart corresponding to the motion detection in Embodiment 2 at S17 as shown in FIG.

First, at S61 to S65 following S16, similarly to S41 to S45 following S16 (concrete steps corresponding to S17 as shown in FIG. 3) as shown in FIG. 6, ALD (=|ΔBLav (X)ij−ΔFLav (X)|) is calculated on the basis of ΔFLav (X) (=FLav (X)−FLav (X−1)) and ΔBLav (X) ij (=BLav (X)ij− BLav (X−1)ij).

Next, at S66, BLav (X)ij is compared with Th1 and at the following step S67, BLav (X−1)ij is compared with Th1.

If at least one of BLav (X)ij or BLav (X−1)ij is greater than Th1, then Th2 is adaptively employed at S68. On the other hand, if both of BLav (X)ij and BLav (X−1)ij is smaller than or equalt to Th1, then Th3 is adaptively employed at S69.

Then, at S70, ALD is compared with Th2 or Th3.

Then, at S71, B (X)ij is determined to be moving, if ALD is greater than Th2 or Th3, while B (X)ij is determined at S72 to be not moving, if ALD is smaller than or equal to Th2 or Th3.

For example, here, it is assumed that the medium sensitivity is selected. Then, B (X)ij is determined to be moving, if at least one of BLav (X)ij or BLav (X−1)ij is greater than 128 (Th1) and moreover if ALD is greater than 70 (Th2). Further, B (X)ij is determined to be moving, if both of BLav (X)ij and BLav (X−1)ij is smaller than or equalt to 128 (Th1) and moreover if ALD is greater than 35 (Th3).

The threshold selection in Embodiment 2 is based on an experimental rule that if at least one of BLav (X)ij or BLav (X−1)ij is greater than an intermediate luminance, then, ALD (=|ΔBLav (X)ij−ΔFLav (X)|) becomes increased, while if both of BLav (X)ij and BLav (X−1)ij is smaller than or equal to the intermediate luminance, then, ALD becomes decreased.

According to the adaptive selection of the thresholds, the precise and stabilized motion detection is assured.

After determining the motion for BL (X)ij, the motion detection result is stored at S73 in RAM 33, then, the motion of the next block is determined. Thus, the motions of all the blocks are detected at S74 and 75.

Modified Embodiments 1 and 2

A detection of motion direction is added in Embodiments 1 and 2 at S18 as shown in FIG. 3.

Figure 9:
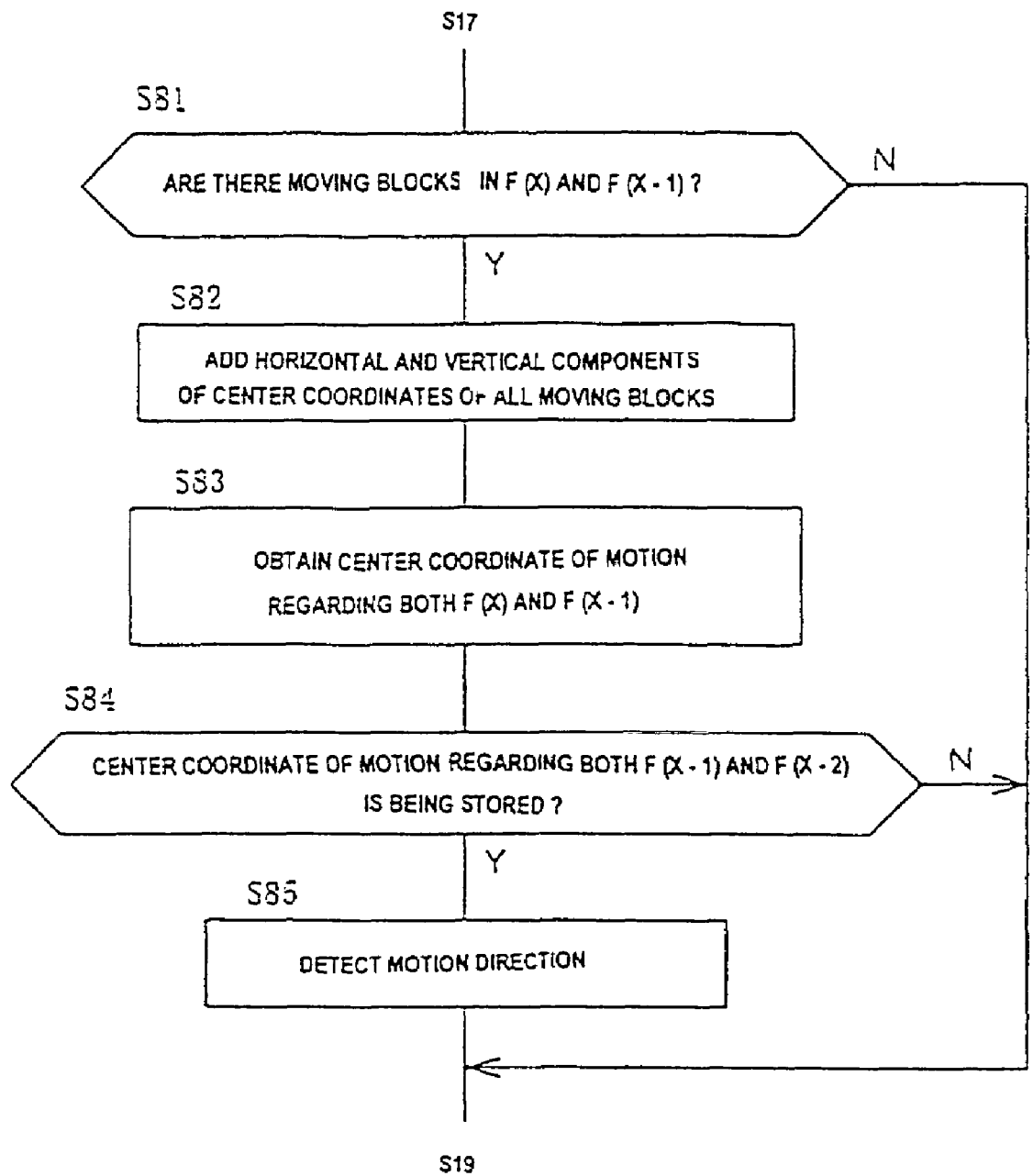
FIG. 9 is a concrete flow chart of the motion direction detection in Modified Embodiments 1 and 2 which may be inserted at the step S18 as shown in FIG. 3.

FIG. 9 is a concrete flow chart of motion direction detection at S18 as shown in FIG. 3.

First, at S81 as shown in FIG. 9 following S17 as shown in FIG. 3, it is determined whether or not there is a motion in the present frame F (X) and past frame. Here, the past frame is a frame F (X) just prior to F (X).

If there is a motion, the horizontal and vertical components of the center coordinates of all the blocks which include the motions are added at S82 for the present frame F (X) and past F (X−1).

Then, the added horizontal and vertical components are divided by the block number "mn", thereby obtaining a center of motion. The center of motion are stored in RAM 33 at S83.

Here, it is assumed that there is a motion in F (X−1) and F (X−2). Accordingly, another center of motion is already being stored in RAM 33.

It is confirmed at S84 whether or not another center of motion for F (X−1) and F (X−2) are already being stored in RAM 33. If it is stored, the motion direction is obtained on the basis of the center of motion for F (X) and F (X−1) and another center of motion for F (X−1) and F (X−2) and the motion direction is stored in RAM 33.

The result of the motion direction detection as well as the result of the motion detection is outputted to the data recording apparatus 28 at S19 as shown in FIG. 3.

On the other hand, if it is determined at S81 that there is not any motion in the present frame F (X) and past F (X−1) and moreover if another center of motion for F (X−1) and F (X−2) are not being stored in RAM 33, it is known that there is not any motion at all.

Steps S81 to S85 are repeated for the next frame F (X+1).

Figure 10:
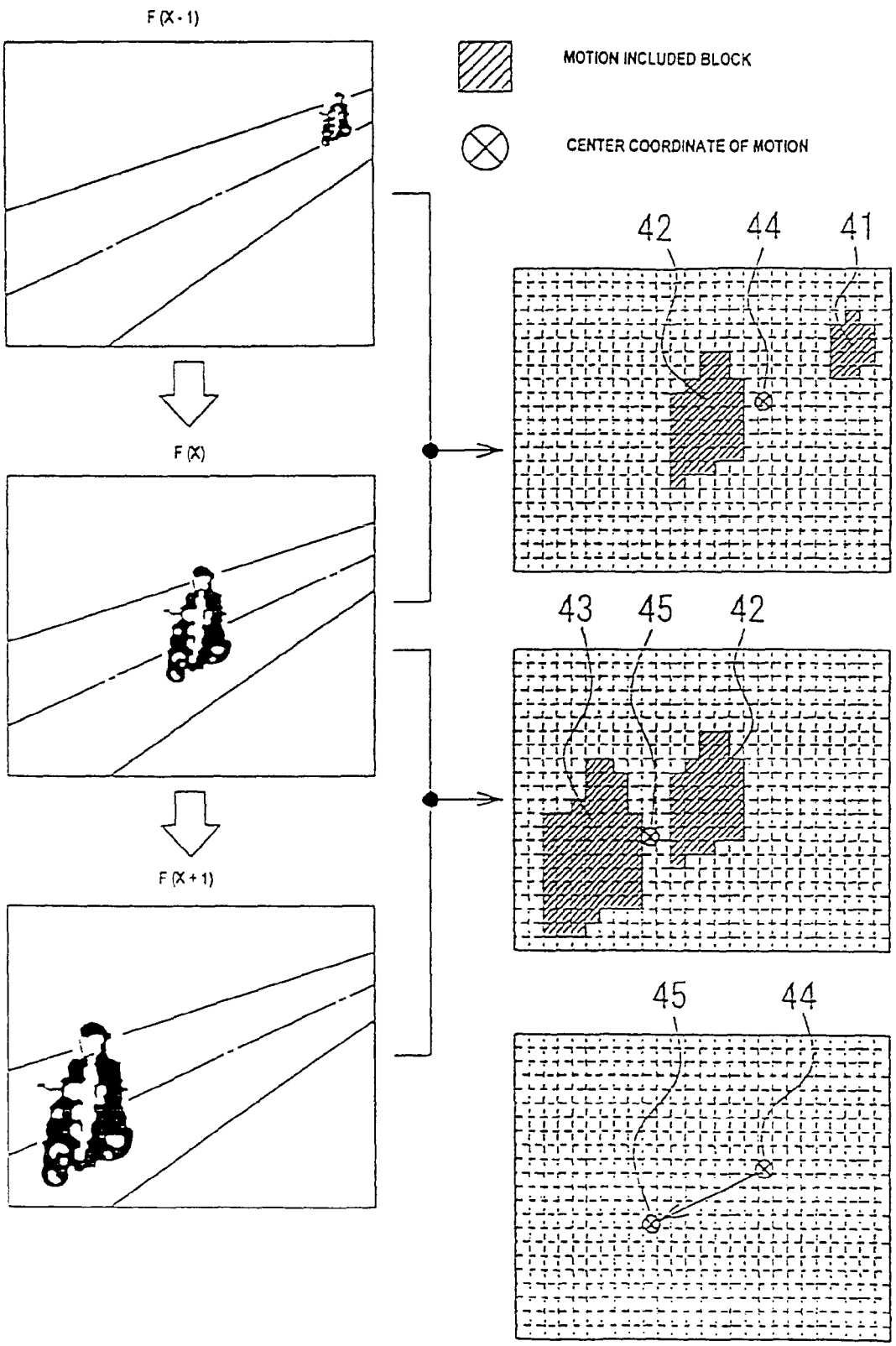
FIG. 10 is an illustration of the motion direction detection in Modified Embodiments 1 and 2 by using sequentially inputted image frames F(X−1), F (X) and F (X+m 1) each of which includes a motion included block group.

FIG. 10 is an illustration of the motion direction detection by using F (X−1), F (X) and F (X+1) which include moving block groups 41, 42 and 43, respectively. The point 44 is a center of movement for both F (X−1) and F (X), while the point 45 is another center of movement for both F (X) and F (X+1). Thus, the motion direction is expressed by vector directing from the point 44 to the point 45.

Figure 11:
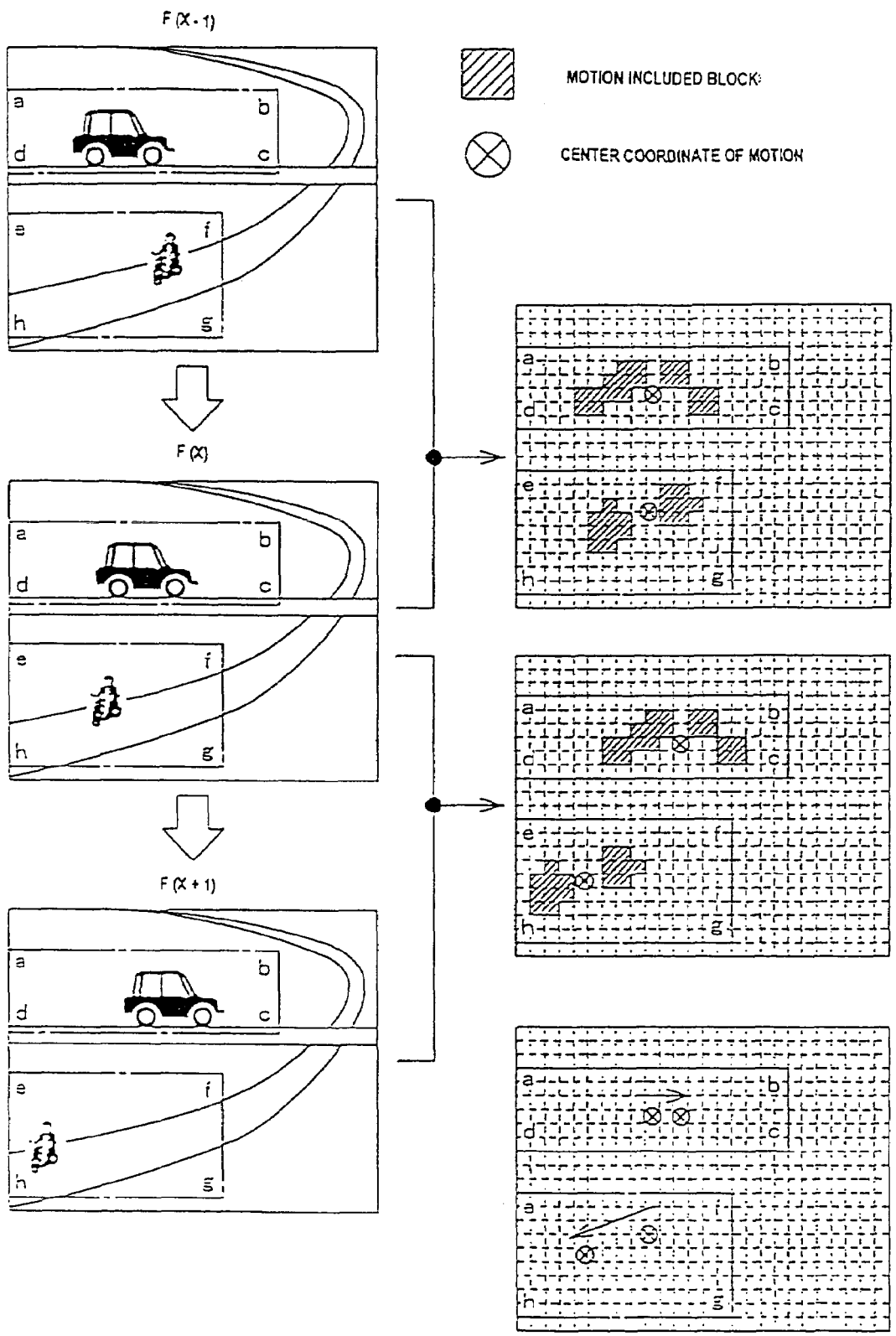
FIG. 11 is an illustration of an example of independently monitoring two areas by utilizing the motion direction detection as illustrated in FIG. 10.

FIG. 11 is an illustration of an example of independently monitoring two highway areas [abcd] and [efgh].

The moving block groups and centers of motion are independently obtained for the areas [abcd] and [efgh], thereby obtaining two independent motion directions.

By limiting the monitoring areas such as [abcd] and [efgh] in an image frame, the calculation load is greatly reduced, thereby reducing the signal processsing load of CPU 31 in the motion detection apparatus 27 of the present invention.

The motion direction may be detected only in one of a plurality of monitoring areas.

Further, for example, only a person who is entering a room may be detected. Further, a person entering a gate may be detected, while another person leaving another gate may be detected.

The present invention is not limited to the above explained Embodiments 1 & 2 and Modified Embodiments 1 & 2.

In Embodiment 1 and 2 and their modifications, all the image frames stored in the image memory 22 were sequentially processed. Accordingly, a series of data processing at S14 to S21 should be completed within a time period of one frame, e.g., 1/30 sec for national television system committee (NTSC) signal system. However, the data processing may be executed every several frames, because there is not necessarily required, in the monitoring systems, to watch every frame. Thus, the data load is greatly reduced and the processing load of the motion detection apparatus 27 is greatly reduced.

As another embodiment, when a moving block is detected, the blocks surrounding the moving block may be weighted, when their motions are to be detected. For example, the determination threshold(s) may be lowered at a prescribed rate, thereby improving the determination reliability.

Further, as other embodiment, when a moving block is isolated, the moving block may be neglected, whereby a very small motion which is not being supposed and a small light source which is turned on and off can be neglected. In order to neglect the isolated moving block, the motion determination criterion may be expressed in such a manner that a certain block is defined to include a motion if there is at least one moving block which surrounds the certain block. FIGS. 12A, 12B and 12C show an exemplified criterion. The detected moving blocks are shown by "○" in FIG. 12A. Then, every moving block is given a score of eight, while every block surrounding the moving block is given a score of one. The example of scores for the blocks are shown in FIG. 12B. As a result, the isolated moving block is removed, if the threshold score Further, as still other embodiment, in order to avoid miss-detection due to, e.g., a vibration of the monitoring camera 1 caused by a wind or earth quake, a vibration sensor may be provided in the monitoring camera 1, thereby compensating an image blur on the basis of the sensor signal. When the image blur can not be well compensated due to an increased vibration amplitude, it may be notified through the input I/F 21 to the control unit 29 that the image blur compensation was executed, thereby preventing the data recording and alarm generation, even when a motion is detected. Alternately, the motion detection apparatus 27 in place of the monitoring camera 1 may compensate the image blur. The motion detection apparatus 27 may also prevent the data recording and alarm generation by recognizing a difference between the primary moving object and vibration on the basis of the vibration sensor signal.

What is claimed is:

1. A motion detection apparatus for detecting a motion in an image frame inputted and stored in a time series, said apparatus comprising:
    a frame division section for dividing the inputted X-th image frame F(X) into a plurality of blocks B(X)ij, where i=1 to m and j=1 to n;
    a block luminance acquisition section for acquiring representative luminance values BLrep(X)ij of said blocks B(X)ij;
    a frame luminance acquisition section for acquiring a representative luminance value FLrep(X) of said inputted frame F(X);
    a storing section for storing BL(X)ij and FLrep(X);
    a block luminance difference calculation section for calculating block luminance differences ΔBLrep(X)ij between corresponding blocks in F(X) and a frame prior to F(X);
    a frame luminance difference calculation section for calculating a frame luminance difference ΔFLrep(X) between F(X) and a frame prior to F(X);
    an absolute difference calculation section for calculating absolute values |ΔBLrep(X)ij−ΔFLrep(X)|;
    a determination section for determining that a certain block includes a motion, if said absolute value for said certain block is greater than a prescribed threshold; and
    an output section for outputting the determination result, wherein:
    said determination section determines that:
        said certain block includes a motion, if said absolute value for said certain block is greater than a second threshold and moreover if either or both of said representative luminance values of the corresponding certain blocks in F(X) and a frame prior to F(X) is/are greater than a first threshold, where said first threshold is greater than said second threshold; or
        said certain block includes a motion, if said absolute value for said certain block is greater than a third threshold and moreover if both of said representative luminance values of the corresponding certain blocks in F(X) and a frame prior to F(X) are smaller than or equal to a first threshold, where said second threshold is greater than said third threshold.

2. The motion detection apparatus according to claim 1, wherein said representative luminance value is an average, mode or median of luminance values.

3. The motion detection apparatus according to claim 1, wherein said frame prior to said present frame F(X) is a frame F(X−1) just prior to F(X) or a frame F(X−k) which is "k" frames prior to F(X), where "k" is greater than or equal to two.

4. A computer readable medium storing a motion detection computer program for detecting a motion in an image frame inputted and stored in a time series, said program comprising the steps of:
    a frame division step for dividing the inputted X-th image frame F(X) into a plurality of blocks B(X)ij, where i=1 to m and j=1 to n;
    a block luminance acquisition step for acquiring representative luminance values BLrep(X)ij of said blocks B(X)ij;
    a frame luminance acquisition step for acquiring a representative frame luminance value FLrep(X) of said inputted frame F(X);
    a storing step for storing BL(X)ij and FLrep(X);
    a block luminance difference calculation step for calculating block luminance differences ΔBLrep(X)ij between corresponding blocks in F(X) and a frame prior to F(X);
    a frame luminance difference calculation step for calculating a frame luminance difference ΔFLrep(X) between F(X) and a frame prior to F(X);
    an absolute difference calculation step for calculating absolute values |ΔBLrep(X)ij−ΔFLrep(X)|;
    a determination step for determining that a certain block includes a motion, if said absolute value for said certain block is greater than a prescribed threshold; and
    an output step for outputting the determination result, wherein:
    said determination step determines that:
        said certain block includes a motion, if said absolute value for said certain block is greater than a second threshold and moreover if either or both of said representative luminance values of the corresponding certain blocks in F(X) and a frame prior to F(X) is/are greater than a first threshold, where said first threshold is greater than said second threshold; or
        said certain block includes a motion, if said absolute value for said certain block is greater than a third threshold and moreover if both of said representative luminance values of the corresponding certain blocks in F(X) and a frame prior to F(X) are smaller than or equal to a first threshold, where said second threshold is greater than said third threshold.

5. The computer readable medium storing the motion detection computer program according to claim 4, wherein said representative luminance value is an average, mode or median of luminance values.

6. The computer readable medium storing the motion detection computer program according to claim 4, wherein said frame prior to said present frame F(X) is a frame F(X−1) just prior to F(X) or a frame F(X−k) which is "k" frames prior to F(X), where "k" is greater than or equal to two.

* * * * *